United States Patent [19]

Polster

[11] Patent Number: 4,503,320
[45] Date of Patent: Mar. 5, 1985

[54] DEEP FAT COOKING TEMPERATURE CONTROL SYSTEM

[76] Inventor: Louis S. Polster, 1017 Fairmount Rd., Burbank, Calif. 91501

[21] Appl. No.: 907,692

[22] Filed: May 19, 1978

[51] Int. Cl.³ .............................................. F27D 11/00
[52] U.S. Cl. ..................................... 219/441; 99/330; 99/337; 219/437; 219/331; 219/513; 219/516; 219/523; 374/180
[58] Field of Search ............... 219/331, 335, 437, 441, 219/442, 516, 513, 523, 544, 449, 450, 429, 430, 435, 436, 438, 439, 494; 99/330, 337, 342; 338/229; 374/180

[56] References Cited

U.S. PATENT DOCUMENTS

| Re. 29,609 | 4/1978 | Wadia | 219/494 |
|---|---|---|---|
| 2,481,384 | 9/1949 | Blackwell | 219/331 X |
| 2,902,582 | 9/1959 | Pappas | 219/331 X |
| 3,134,008 | 5/1964 | Finn | 219/516 |
| 3,187,161 | 6/1965 | Finn | 219/437 X |
| 3,511,970 | 5/1970 | Kjellberg | 219/331 |
| 3,673,385 | 6/1972 | Drugmand et al. | 219/335 |
| 3,720,155 | 3/1973 | Fritzsche | 99/337 |
| 3,866,472 | 2/1975 | Witt | 99/342 |
| 3,938,498 | 2/1976 | Price | 219/437 X |
| 4,039,778 | 8/1977 | Williams | 219/544 |
| 4,121,460 | 10/1978 | Ekstrom | 374/180 |

Primary Examiner—Volodymyr Y. Mayewsky
Attorney, Agent, or Firm—Allan M. Shapiro

[57] ABSTRACT

An elongated temperature-sensing probe is positioned in a deep fat cooking vessel and is positioned so that a portion of the probe extends adjacent the electric heater submerged in the deep fat adjacent the bottom of the vessel, and a portion extends upward in the fat into the cooking zone in the vessel. The temperature-sensing probe is connected to control the power to the heater. The heater is thermally connected to the probe so that the probe receives direct conduction heat from the heater as well as senses the heat adjacent the heater and in the cooking zone.

8 Claims, 3 Drawing Figures

U.S. Patent   Mar. 5, 1985   4,503,320
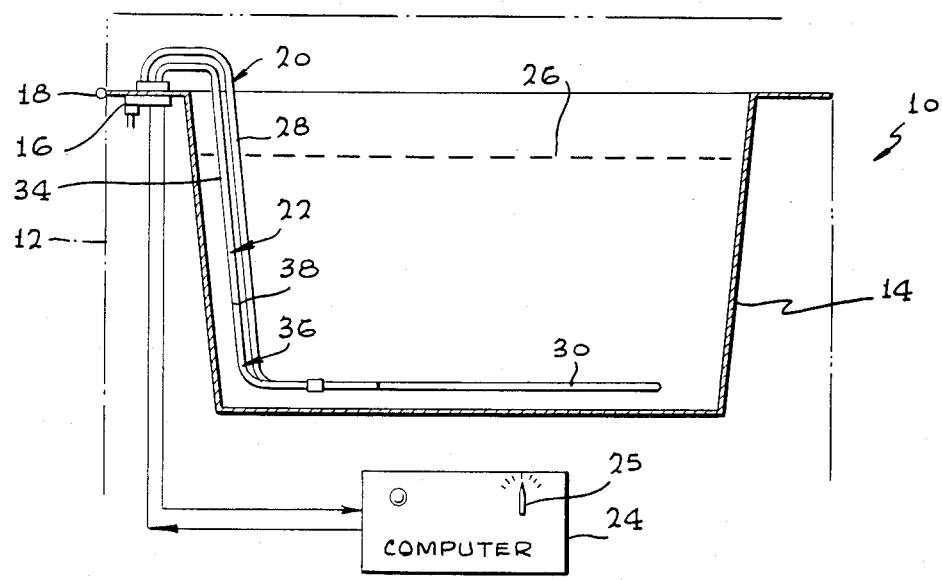
Fig. 1
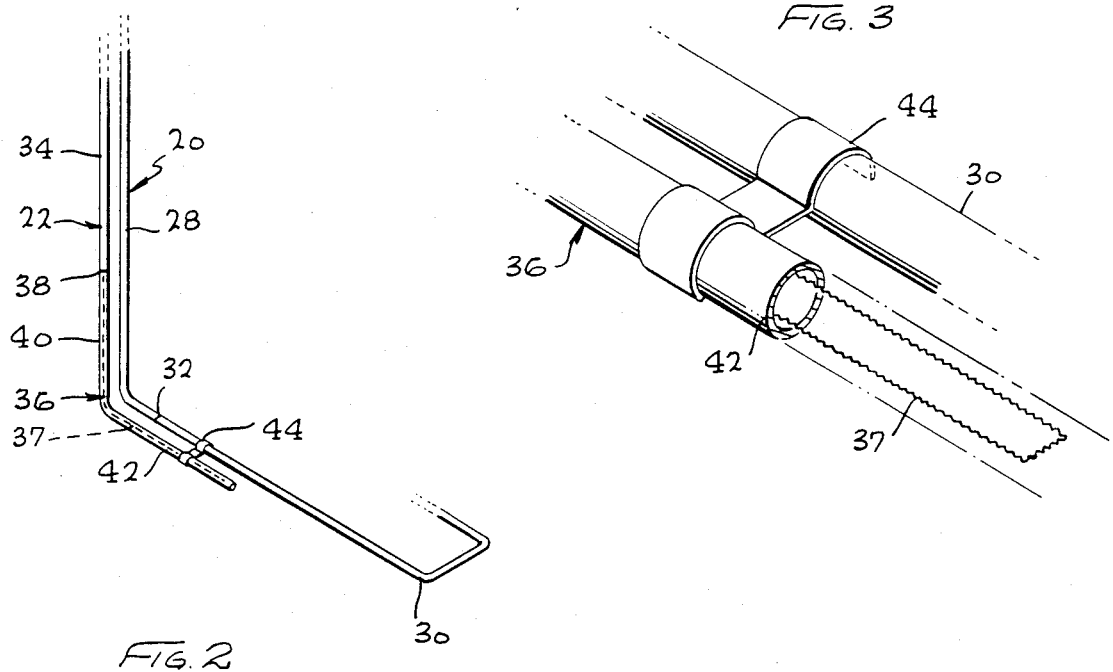
Fig. 2
Fig. 3

DEEP FAT COOKING TEMPERATURE CONTROL SYSTEM

BACKGROUND OF THE INVENTION

1. Field of the Invention

This invention is directed to deep fat cooking equipment and particularly the temperature control system for controlling the temperature of the deep fat therein for proper deep fat cooking.

2. Description of the Prior Art

Prior art deep fat cooking equipment includes a vessel in which the deep fat is contained and heated. Food items are placed in this deep fat and are cooked therein at an appropriate temperature and for an appropriate time. A heater is submerged in the deep fat, and the heater is controlled to attempt to maintain proper cooking conditions in the deep fat.

There are three heating conditions in a deep fat cooking system which require the control of the heater. First, when the vessel and the fat therein are cool, the heat input rate may have to be reduced if the heater power is large. Second, the raising of the temperature from the cold to the desired cooking temperature should be accomplished smoothly without the heater turning off too soon and without the heater turning off too late. In the first case, the desired cooking temperature is not reached as quickly as is desired for proper cooking and, in the second case, overheating of the cooking oil reduces its life and may raise the oil temperature to a dangerously high value, as far as both proper cooking and fire are concerned.

Prior art deep fat fryers have a cooking vat with an electric heater submerged in the oil in the bottom of the vat. A temperature sensor in the form of a bulb on the end of a capillary tube is supported closely adjacent and under the heater element. That temperature sensor is in the hot zone so that it turns off too soon, because it measures the oil temperature very close to the heater and not in the cooking zone above the heater. In other cases, the sensor is positioned in a corner of the vat in order to protect it from damage from the food baskets, but when the sensor is in an out-of-the-way position, the heater is likely to stay on too long because the temperature sensor is too far away from the heater. Convection is poor, even in heated oil, because of the viscosity. Conduction is also poor so that, when the sensor is located in an out-of-the-way place, the oil around the heater and in the cooking zone get too hot before set temperature is sensed.

As far as heating up is concerned, one teaching states that, during the melting cycle, the intial melting occurs during reduced heat input from the electric heater, and when the temperature sensor in the vat reaches a certain temperature, then the heater goes into full heating power condition. However, this system is not satisfactory because, when a block of solid shortening is placed in the vat, the heater melts the bottom of the block up to fill the bottom of the vat around the heater and then the fat circulates up around the block of still solid shortening. This circulating liquid is in contact with the temperature sensor which signals that the full heating power should be applied. However, since there is solid shortening in the vat, circulation is inhibited, and local overheating is likely.

Furthermore, during the cooking cycle when food product is put into the hot oil to be cooked, there is a considerable demand for heat because a considerable amount of heat is extracted from the hot oil by the boiling off of water in the food product. In order to maintain the deep fat at the proper temperature, its temperature condition must be sensed. Therefore, there is need not only to sense the temperature directly adjacent the heater, but also need to sense the deep fat temperature in the cooking zone.

SUMMARY OF THE INVENTION

In order to aid in the understanding of this invention, it can be stated in essentially summary form that it is directed to a deep fat cooking temperature control system wherein a temperature-sensing probe is positioned in the deep fat vessel in such a manner as to receive heat by thermal coupling directly from the heat source and also sense the temperature of the deep fat away from the heater.

It is thus an object of this invention to provide a deep fat cooking temperature control system wherein temperature is properly controlled for optimum cooking conditions. It is a further object to control the deep fat cooking temperature in a manner to prevent an initial overshoot of the fat temperature over the desired preselected set point. It is another object to provide a deep fat cooking temperature control system whereby the deep fat temperature is controlled at or near the desired set point when the deep fat cooker is warmed up and is awaiting food material to be cooked. It is a further object to provide a deep fat cooking temperature control system wherein temperature in the cooking zone of the deep fat fryer is sensed even though the temperature sensor is placed in a position where it will not be damaged by the entry of food cooking baskets into the fryer vessel. It is another object to prevent over-temperature of the cooking oil by proper temperature sensing to provide for a maximum of cooking oil life.

The features of the present invention which are believed to be novel are set forth with particularity in the appended claims. The present invention, both as to its organization and manner of operations, together with further objects and advantages thereof, may be understood best by reference to the following description taken in conjunction with the accompanying drawings.

BRIEF DESCRIPTION OF THE DRAWINGS

FIG. 1 is a side elevational view, with parts broken away and parts taken in section, of a deep fat cooker employing the deep fat cooking temperature control system of this invention.

FIG. 2 is an isometric view of a portion of the heater showing the temperature probe for the temperature control system shown in conjunction therewith.

FIG. 3 is an enlarged isometric view of the clamp and thermal shunt with parts broken away and parts taken in section.

DESCRIPTION OF THE PREFERRED EMBODIMENT

The deep fat cooker is generally indicated at 10 in FIG. 1. Deep fat cooker 10 includes housing 12 in which is located deep fat cooking vessel 14. Housing 12 supports the cooking vessel and may provide for removability of the cooking vessel. The housing also provides insulation so that the cooking vessel is protected against excessive heat loss and inadvertent contact from the outside.

Mounting plate 16 is pivoted on housing 12 on hinge 18. Heater 20 is mounted on mounting plate 16 so that the heater 20 can be swung up and out of cooking vessel 14 for the cleaning and/or removal of the vessel. Temperature-sensing probe 22 is also supported on mounting plate 16. The nominal level of deep fat in the vessel 14 has its top at the dash line 26 so that both the lower part of the heater 20 and temperature-sensing probe 22 are submerged in the fat.

Computer 24 is connected to receive the temperature signal from temperature-sensing probe 22 and is connected to control the power to heater 20. While an electric heater 20 is given as a preferred example, it is clear that heat can alternatively be supplied to the cooking vessel by means of an exterior gas flame. In addition to the temperature sensed by probe 22, computer 24 also receives information as to the set point (that is, the desired deep fat temperature) and receives information as to whether the heating of cooker 10 is in a start-up, warm-up mode or is in a mode where the cooker is ready for or is actually cooking food product. Temperature-sensing probe 22 delivers temperature rate-of-change information to computer 24 as well as the actual sensed temperature. Computer 24, in turn, as stated above, controls the delivery of electric power to heater 20.

As seen in FIG. 2, heater 22 has a descending leg 28 which reaches almost to the bottom and a heater portion 30 which extends sinuously across adjacent the bottom of the vessel 14. The upper part of heater 20, particularly the descending leg 28 and the portions thereabove which are secured to mounting plate 16, are mere physical supports and electric conductors. That portion of heater 20 does not contain a heating element, but an insulated conductor therein extends to point 32 where the material in the heater tube changes from a low resistance conductor to a high resistance heater, such as a small diameter nichrome wire. Such heaters are well-known and are widely used. They are known under the trademark "Calrod." In these heaters, the heating element is protected with an exterior sleeve.

Temperature-sensing probe 22 similarly has a support portion 34 which supports the temperature-sensing probe on mounting plate 16. Beyond supporting portion 34, temperature-sensing probe 22 has its sensing portion 36. The sensing portion is preferably a temperature-resistance transducer. It is a unitary structure in which the resistance changes with temperature. The length of the sensing portion 36 extends from below point 38 so that the sensing portion has an upright leg 40 and a lower leg 42. Temperature-sensing probe 22 is positioned behind heater 20 so that it is protected against damage from food product baskets which are placed in the hot fat. The temperature-sensing probe is more sensitive to physical damage than the heater, and thus protection by the heater is desirable. The lower leg 42 of the temperature-sensing probe 22 extends adjacent to the heater portion 30. As seen in FIG. 3, clamp 44 mechanically supports lower leg 42 at a fixed, preselected distance from heater portion 30 and thermally couples the sensing portion to the heater portion with a known, preselected thermal shunt. Clamp 44 serves as this thermal shunt which feeds heat from the heater to the sensor.

From this construction, it can be seen that there are several important critical aspects to temperature-sensing probe 22. There is an upright leg 40 together with the horizontal lower leg 42 and there is the clamp 44 which serves as a thermal shunt. Thus, the temperature of the oil in the cooker is sensed directly adjacent the heater by virtue of the lower leg 42 directly adjacent the heater portion 30. Furthermore, the temperature of the oil above the bottom and away from the heater and in the cooking zone is sensed by the upright leg 40. In addition, heat is fed from the heater to the sensor by means of the thermal shunt 44. These three factors are averaged together because temperature-sensing probe 22 is a temperature-resistance transducer which senses along its entire length from point 38 to its outer end. Thus, it does not have a localized sensing spot, but averages the sensing over the whole length of the sensing portion 36. There are a number of materials which change resistance with changing temperature, and an optimum one is chosen for this temperature range. FIG. 3 shows a resistance wire 37 within sensing portion 36 as the sensitive device. The resistance wire is connected to computer 24 and thereby produces a single effectively in response to temperature and temperature changes for control of heater operation.

The relationships of the various parts are critical but depend upon the size and power of the deep fat cooker 10 with which the control system is installed. In a particular example, when vessel 14 is sized to receive 50 pounds of shortening and the heater 30 is sized to provide 22 kilowatts of power, then clamp 44 will be fairly small. It would be about ½ inch wide in the direction along the heater portion 30 and is of such length to space the sensing portion 36 about ½ inch from the heater portion 30. Furthermore, the length of sensing portion 36 would be about 6 inches with about 2 inches in the lower leg 42 and about 4 inches in the upright leg 40. Thus, about 3½ inches of upright leg 40 would be in the level of the zone where the food product is to be cooked, and the rest of the sensing portion 36 is down in the hot zone below the food at the level of the heater.

In a particular cycle of operation beginning with cooker 10 in the cold condition, first the set point or desired cooking temperature is indicated to computer 24, as by dial 25. Second, the melt mode of operation is signalled to the computer as by pressing the button and, thereupon, the system is started. The electric power to heater 20 is chopped, as with an SCR which chops every cycle to a reduced power value so that the surface of the heating element does not rise to a point where it will scorch the solid shortening. The solid shortening is a very poor conductor of heat so that full power cannot be applied. The melting cycle continues for a pre-established period of time. The time is chosen so that, at the end of the time, the fat is between 160 and 200 degrees F., and there is normally no solid shortening in the vessel.

Thereupon, the full power comes on, and the heater portion 30 of heater 20 becomes very hot, and the heat is distributed through the fat principally by convective circulation. However, due to the viscosity of the fat, the circulation is slow, and the temperature at the surface of the heater element is quite high. This temperature, coupled with the thermal mass of the heating elements themselves, provides a large heat reservoir. If the heater is not turned off until the fat temperature rises to the set point, then the heat from the thermal mass of the heater will be delivered to the fat, and the fat will get too hot. It is here where the thermal coupling of clamp 44 delivers sufficient heat to sensing portion 36 so that the temperature of the fat, as detected by the upright leg 40, coupled with the temperature of the fat sensed by the lower leg 42 plus the heat transmitted by thermal shunt 44 indicates that there is sufficient heat in the unit to average out at the set point. Usually, the hot fat temperature is 20 to 30 degrees below the set point when heater shutoff occurs, and the heat stored in the heater then carries the cooking fat up to the set point. With a smaller thermal shunt 44, the stored heat in the heater portion 30 would be inadequately detected, and the fat temperature would overshoot the set point. When the thermal shunt 44 is too large, then the heat stored in the thermal mass of the heater portion would be oversensed, and the fat temperature would not reach the set point after the heater shuts off. Thus, the value of the thermal shunt 44 together with the positioning of both the upright leg and lower 42 is critical to reaching the set point in the desired proper manner, i.e., as rapidly as possible without scorching while neither overshooting nor undershooting the set point.

During the cooking cycle, a basket of frozen, sliced potatoes will be introduced into the vat of hot fat in order to make French-fried potatoes. This causes a considerable turbulence, because water rapidly boils off of the potatoes. Due to the steam boiling off in the hot fat, the upper level of the hot fat is cooled so that the upright leg 40 of the temperature-sensing probe senses a temperature that is not nearly the average temperature of the fat. This sensing turns the heater on and maintains it on because, as long as there is turbulence due to boiling of water off of the potatoes, there is a considerable need for introduction of heat energy. The presence of the upright leg 40 of the sensor prevents the heater from shutting off prematurely, and thus temperature is maintained and the French-fried potatoes are cooked and browned to the proper consistency and color.

With this construction, it is clear that the temperature-sensing probe senses the temperature both in the cooking region above the heater and senses the temperature in the heater region, as well as senses the amount of stored heat in the heater element. With this combination of sensing, the temperature in the cooking region is maintained at the set point.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A deep fat fryer comprising:
   a deep fat vessel having a heater region adjacent the bottom thereof and a cooking region above said heater region;
   a heater having a heating portion within said heater region to heat deep fat in said vessel;
   a temperature-sensing probe having a unitary sensing portion within said vessel, said sensing portion comprising:
   an upright leg portion positioned within said vessel above said heating portion and within said cooking region for sensing the temperature of the fat within said cooking region, and
   a lower leg portion positioned within said vessel adjacent said heating portion and within said heater region for sensing the temperature of the fat within said heater region; and
   a thermal shunt interconnecting said lower leg portion of said temperature-sensing probe and said heating portion of said heater so that said sensing portion of said temperature-sensing probe senses and provides an output responsive to the combined temperatures of the cooking and heating regions of the fat and the heating portion of the heater.

2. The deep fat fryer of claim 1
   wherein said temperature-sensing probe is a temperature-electrical resistance transducer and said upright and lower leg portions are contiguous.

3. The deep fat fryer of claim 1 wherein said
   thermal shunt comprises a clamp engaged over both said lower leg of said temperature-sensing probe and said heating portion so that heat from said heater is directly coneucted to said temperature-sensing probe.

4. The deep fat fryer of claim 3 wherein
   the heater extends up out of the vessel and said temperature-sensing probe has a support portion which extends up out of the vessel and is positioned with respect to the heater so that it is protected by the heater against physical damage.

5. The deep fat fryer of claim 4 wherein said
   temperature-sensing probe is connected to a controlled and the heater is connected to be controlled by said controller.

6. The deep fat fryer of claim 5 wherein said controller is adjustable for the desired deep fat temperature and controls the heater in accordance with the temperature sensed by said temperature-sensing probe to control the heater to bring the deep fat to the set point temperature.

7. The deep fat fryer of claim 6 wherein said temperature-sensing probe is a temperature-electrical resistance transducer which averages the sensed temperature along the sensing portion of said temperature-sensing probe to average the temperature between the upright leg and lower leg of said probe.

8. The deep fat fryer of claim 6 wherein said controller has means for providing a warm-up cycle for a predetermined time at a reduced heat input rate by the heater.

* * * * *